US012470761B2

(12) United States Patent
McCullough

(10) Patent No.: US 12,470,761 B2
(45) Date of Patent: Nov. 11, 2025

(54) PORTABLE REFRIGERATED BAR AND ENTERTAINMENT SYSTEM

(71) Applicant: Tracer McCullough, San Diego, CA (US)

(72) Inventor: Tracer McCullough, San Diego, CA (US)

(*) Notice: Subject to any disclaimer, the term of this patent is extended or adjusted under 35 U.S.C. 154(b) by 40 days.

(21) Appl. No.: 17/839,466

(22) Filed: Jun. 13, 2022

(65) Prior Publication Data
US 2022/0400303 A1   Dec. 15, 2022

Related U.S. Application Data

(60) Provisional application No. 63/209,991, filed on Jun. 12, 2021.

(51) Int. Cl.
H04N 21/41 (2011.01)
F25D 23/12 (2006.01)
H04R 1/02 (2006.01)

(52) U.S. Cl.
CPC ............. H04N 21/41 (2013.01); F25D 23/12 (2013.01); H04R 1/025 (2013.01)

(58) Field of Classification Search
CPC .......... H04N 21/41; F25D 23/12; H04R 1/025
See application file for complete search history.

(56) References Cited

U.S. PATENT DOCUMENTS

| 4,829,910 | A | * | 5/1989 | Lirette | A47B 83/045 108/35 |
| 5,803,562 | A | | 9/1998 | Jacobs | |
| 6,443,543 | B1 | | 9/2002 | Chiang | |
| 7,832,694 | B2 | | 11/2010 | German | |
| 8,775,828 | B2 | | 7/2014 | Coonan | |
| 9,445,665 | B2 | | 9/2016 | Huang | |
| 9,485,460 | B2 | | 11/2016 | McCullough | |
| 9,813,668 | B2 | | 11/2017 | McCullough | |
| 2003/0214206 | A1 | * | 11/2003 | Kocienski | A47B 5/06 312/314 |
| 2005/0110461 | A1 | | 5/2005 | McConnell | |
| 2006/0061942 | A1 | * | 3/2006 | Abel | A47B 21/0073 361/636 |

(Continued)

OTHER PUBLICATIONS

Coalesse Conferencing and Storage Specification Guides, Exponents Design Coalesse Design Studio, Aug. 2013.

*Primary Examiner* — Yassin Alata
(74) *Attorney, Agent, or Firm* — Gary L. Eastman, Esq.; Eastman IP

(57) ABSTRACT

A portable refrigerated bar and entertainment system is disclosed. The system can have a cabinet having a viewing screen, a viewing screen mount configured to deploy and stow the viewing screen within the cabinet, a cold storage unit, one or more convenience lights, a sound system, and a communication system for communicating with WiFi, Bluetooth, Cellular, and a local area network. The system receives power from an input power source. The system can include a power storage system for powering the various components of the system through a power distribution system when no input power is present. A charging/maintaining system charges and maintains the power storage system. The power storage system provides power to an AC inverter, which provides power to the power distribution system when no input power is present.

20 Claims, 19 Drawing Sheets

(56) References Cited

U.S. PATENT DOCUMENTS

| | | | |
|---|---|---|---|
| 2008/0116327 A1 | 5/2008 | Goldberg | |
| 2008/0165481 A1* | 7/2008 | Kirschner | A47C 19/022 |
| | | | 361/728 |
| 2010/0026151 A1* | 2/2010 | Melkumyan | B62B 3/005 |
| | | | 312/249.11 |
| 2010/0171889 A1* | 7/2010 | Pantel | G02F 1/133308 |
| | | | 349/1 |
| 2012/0234309 A1* | 9/2012 | Horito | A47J 37/0786 |
| | | | 126/25 R |
| 2018/0056843 A1* | 3/2018 | Michalski | B62B 5/0036 |
| 2020/0105085 A1* | 4/2020 | Jafa | G05D 1/0088 |

* cited by examiner

PORTABLE REFRIGERATED BAR AND ENTERTAINMENT SYSTEM

RELATED APPLICATION

This application claims priority to U.S. Provisional Patent Application Ser. No. 63/209,991 for a "Portable Refrigerated Bar and Entertainment System," filed Jun. 12, 2021, and the entirety of which is incorporated herein by this reference.

FIELD OF THE INVENTION

The present invention pertains generally to entertainment systems. More specifically, the present invention provides a portable bar and entertainment system.

BACKGROUND OF THE INVENTION

For the last several thousand years, mankind has endeavored to relax and be entertained in various settings. For example, in the days of the Roman Empire, people would flock to amphitheaters or coliseums to watch various events. In modern society, especially in the digital age, people would congregate at various locations, such as a bar, restaurant, stadium, arena, meeting hall, or even a person's house to relax and be entertained.

Typically, visual entertainment would be implemented separately from liquid refreshments. This would require dedicated space for the refreshments and the visual entertainment would be implemented at a permanent location separate from the location of the refreshments. Having to designate separate areas for refreshments and visual entertainment requires extra planning to locate and implement each aspect of the entertainment experience.

Portable refreshment stations have typically been used in multipurpose settings, such as a meeting hall or a person's back yard or patio. In these settings, any visual entertainment is typically permanently located at a fixed position, although the visual entertainment can be mounted on a portable fixture. If the visual entertainment system is portable, it usually needs to be positioned manually. The refreshment station and the visual entertainment system, whether portable or stationary, needs to then be protected from the outside environment to prevent damage.

A portable refrigerated bar and entertainment system having a refreshment preparation station and a visual entertainment system where the refreshment preparation station is coverable and the visual entertainment system is retractable into the cabinet such that the viewing screen is protected from outside elements when not in use is both needed and desirable.

SUMMARY OF THE INVENTION

The present invention is directed toward a portable bar and entertainment system. In various embodiments, the portable bar and entertainment system includes a cabinet having a viewing screen compartment. The cabinet can also include a storage compartment, a cover for the viewing screen compartment, and a service area.

In some embodiments, the service area can have a condiment holder storage area, condiments holders, a preparation surface, a utensil/utility storage, and a beverage storage compartment.

In other embodiments, the viewing screen compartment has a viewing screen and a viewing screen mount. The viewing screen mount can extend from the viewing screen compartment. The viewing screen mount can rotate from a front facing position to a rear facing position.

In additional embodiments, the storage compartment can have one or more shelves. The shelves can be at least one large bottle storage shelf. The storage compartment can also have a utility box. The utility box can have a power outlet, a USB port, and a dimmer switch to control lighting internal and external to the cabinet.

In some embodiments, the cabinet can have a utility access located on the rear of the cabinet. The utility access can allow access to the interior of the cabinet and any components located internally to the cabinet.

In other embodiments, the viewing screen can be a television or a projector screen.

In additional embodiments, the portable bar and entertainment system can communicate with a local area network via a cable, WiFi, Bluetooth, cellular, or a combination thereof.

In some embodiments, the portable bar and entertainment system can be powered from an external power source. The portable bar and entertainment system can be powered from a power source located internal to the cabinet. The internal power source can be one or more batteries or an Uninterruptable Power Supply. The internal power source can be rechargeable. The power source can include a power inverter to generate AC power to run the various components of the portable bar and entertainment system.

In additional embodiments, the functions of the portable bar and entertainment system, such as deploying and storage of the viewing screen, convenience light intensity, and application of power to the various components of the portable bar and entertainment system can be controlled remotely.

The present invention is also directed toward a portable refrigerated bar and entertainment system. In various embodiments, the portable refrigerated bar and entertainment system includes a cabinet having a viewing screen compartment. The cabinet can also include a storage compartment, a cover for the viewing screen compartment, and a service area.

In some embodiments, the service area can have a condiment holder storage area, condiments holders, a preparation surface, a utensil/utility storage, and a beverage storage compartment.

In other embodiments, the viewing screen compartment has a viewing screen and a viewing screen mount. The viewing screen mount can extend from the viewing screen compartment. The viewing screen mount can rotate from a front facing position to a rear facing position.

In additional embodiments, the storage compartment can have one or more shelves. The shelves can be at least one large bottle storage shelf. The storage compartment can also have a utility box. The utility box can have a power outlet, a USB port, and a dimmer switch to control lighting internal and external to the cabinet.

In some embodiments, the cabinet can have a utility access located on the rear of the cabinet. The utility access can allow access to the interior of the cabinet and any components located internally to the cabinet.

In other embodiments, the viewing screen can be a television or a projector screen.

In additional embodiments, the portable refrigerated bar and entertainment system can communicate with a local area network via a cable, WiFi, Bluetooth, cellular, or a combination thereof.

In some embodiments, the portable refrigerated bar and entertainment system can be powered from an external power source. The portable refrigerated bar and entertainment system can be powered from a power source located internal to the cabinet. The internal power source can be one or more batteries or an Uninterruptable Power Supply. The internal power source can be rechargeable. The power source can include a power inverter to generate AC power to run the various components of the portable bar and entertainment system.

In other embodiments, the portable refrigerated bar and entertainment system can have a cold storage unit and one or more convenience lights. The cold storage unit can be a refrigerator. The convenience light can be incandescent, LED, compact fluorescent, or any other type of lighting known in the industry. The convenience light can be dimmable.

In additional embodiments, the functions of the portable bar and entertainment system, such as deploying and storage of the viewing screen, convenience light intensity, and application of power to the various components of the portable refrigerated bar and entertainment system can be controlled remotely.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION

Embodiments of the present invention are described herein in the context of a portable refrigerated bar and entertainment system.

Those of ordinary skill in the art will realize that the following detailed description of the present invention is illustrative only and is not intended to be in any way limiting. Other embodiments of the present invention will readily suggest themselves to such skilled persons having the benefit of this disclosure, Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
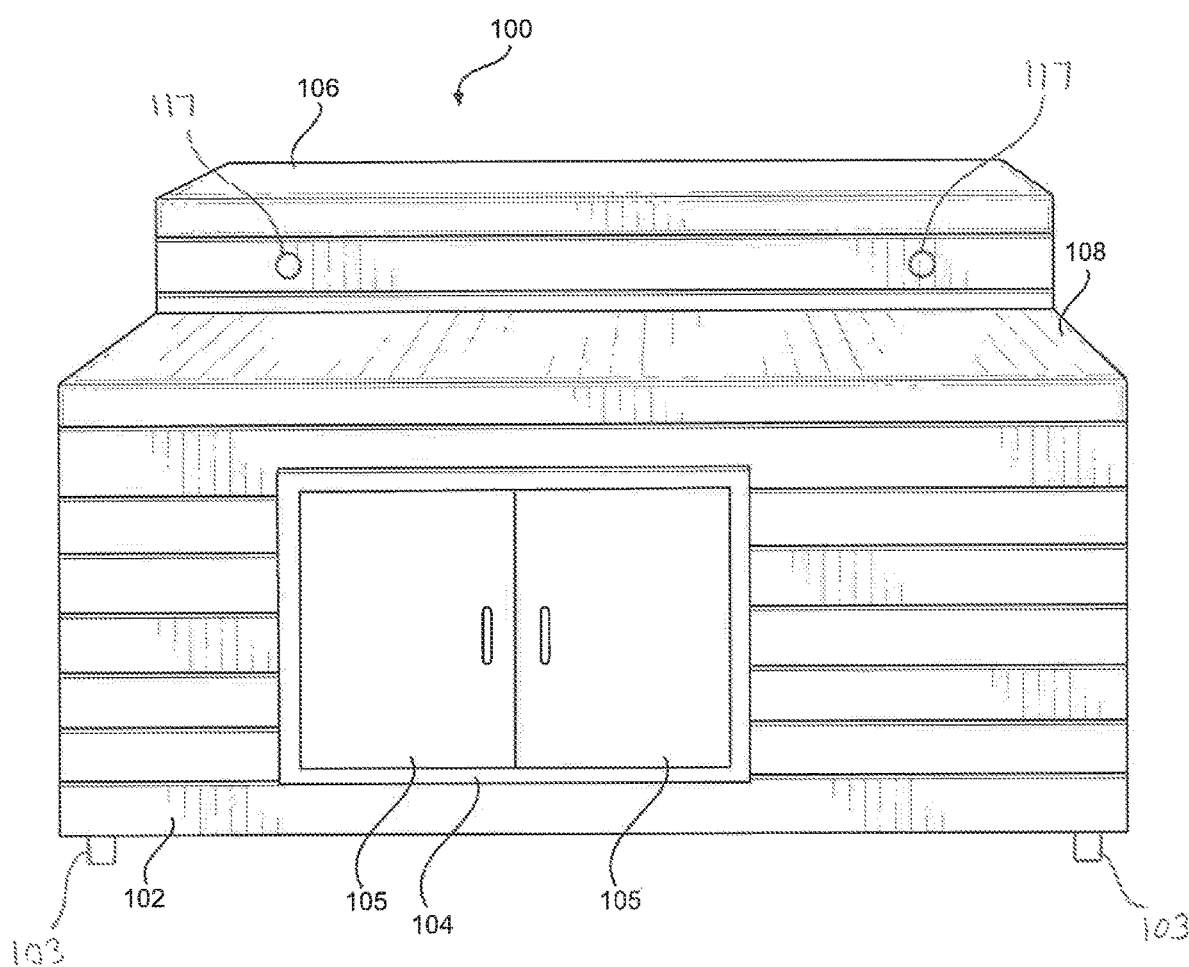
FIG. 1 is a front view of a Portable Bar and Entertainment System of the present invention in a closed condition.

Referring initially to FIG. 1, a portable bar and entertainment system of the present invention is shown and generally referred to as 100. As shown in FIG. 1, the portable bar and entertainment system is shown in the storage condition. As shown, the portable bar and entertainment system 100 comprises a cabinet 102, a storage compartment 104, a screen compartment cover 106, and a service area cover 108. The cabinet 102 can be made from wood, plastic, and metal and can have a decorative veneer cover disposed on the cabinet's 102 outer surface. In a preferred embodiment, wheels 103 on the bottom of cabinet 102 facilitate portability of portable bar and entertainment system 100. The storage compartment 104 can have one or more storage compartment doors 105. The storage compartment doors 105 can be made from wood, metal, plastic, glass or any other material known in the industry suitable for its intended purpose. In some embodiments, the storage compartment doors 105 can be made from a material identical to the cabinet 102 or can be made to look like the cabinet 102.

The viewing screen cover 106 is designed to seal the viewing screen compartment 111 (see FIG. 2) from weather elements during periods of storage. The viewing screen cover 106 can be made from wood, plastic, metal, or any other material known in the industry suitable for its intended purpose. In some embodiments, the viewing screen cover 106 can have a decorative veneer covering applied to the outside of the viewing screen cover 106. In certain embodiments, the viewing screen cover 106 can have a mechanical seal, such as a gasket, configured to prevent external elements, such as wind, rain, and dirt from entering into the viewing screen compartment 111 during periods of storage.

The service area cover 108 is designed to seal the service area 120 (see FIG. 2) to protect it from weather elements during periods of storage. The service area lid 108 can be made from wood, plastic, metal, or any other material known in the industry suitable for its intended purpose. In some embodiments, the service area cover 108 has a mechanical seal, such as a gasket, to ensure the service area lid securely seals the service area 120 (see FIG. 2) from external weather elements such as dust, dirt, and rain.

Figure 2:
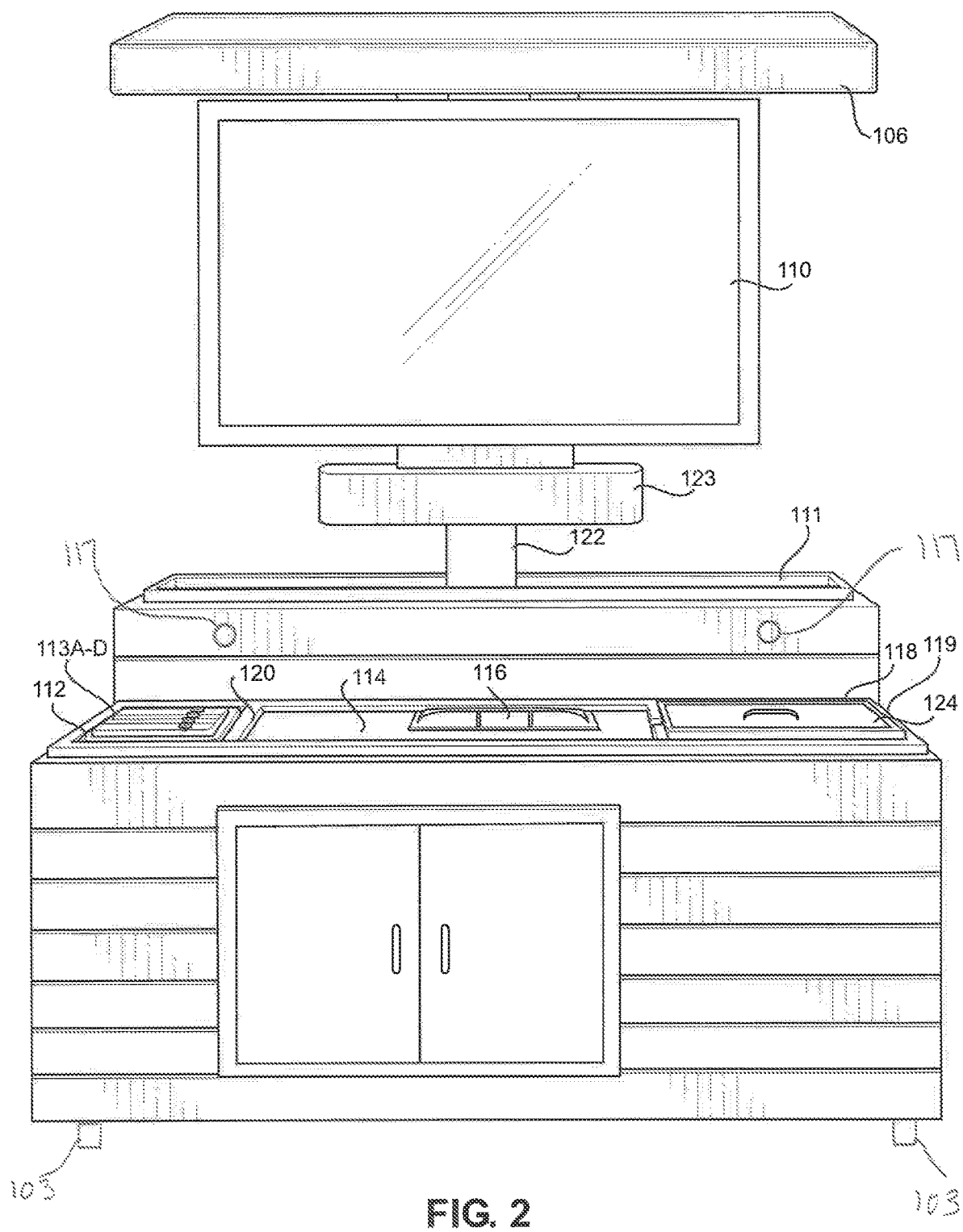
FIG. 2 is front view of the Portable Bar and Entertainment System of FIG. 1 in a deployed condition.

Referring to FIG. 2, a front view of the portable bar and entertainment center 100 with the service area cover 108 removed and a viewing screen 110 extended from the viewing screen compartment 111 is shown. The portable bar and entertainment system 100 has a service area 120 configured to be covered by the service area cover 108. In some embodiments, the service area 120 can have a condiment holder storage compartment 112 configured to hold one or more condiment holders 113a-d, a preparation surface 114, a utensil storage 116, and a beverage storage 118. The condiment holder storage compartment 112 can hold one or more condiment holders. For example, as shown in FIG. 2, the condiment holder storage compartment 112 can have four (4) condiments holders 113a-d, however this is not to be considered to be limiting. The condiment holder storage compartment 112 can be filled with ice or any other item that will maintain or assist in maintaining the contents of the condiment holders 113a-d at a desired temperature.

The preparation surface 114 can be constructed from a material resistant to the cutting action of a knife blade. For example, the preparation surface 114 can be made from wood, plastic, or any other material known in the industry capable of withstanding repeated impacts from knife blades. In some embodiments, the preparation surface 114 is removable from the service area 120 for cleaning, maintenance, or replacement. In other embodiments, the preparation surface 114 can display a particular logo, name, or picture.

The utensil storage 116 is configured to hold multiple utensils plus any items capable of being received by the utensil storage 116, such as bottles or jars. For example, the utensil storage 116 can hold bottle openers, wine openers, knives, or any other utensil usable with the portable bar and entertainment system 100. The utensil storage 116 can be located at any location in the service area 120.

The beverage storage 118 is located in the service area 120 in a beverage storage compartment 119. The beverage storage 118 can have a beverage storage cover 124 configured to cover and seal the beverage storage 118. In some embodiments, the beverage storage cover 124 is removable. In other embodiments, the beverage storage cover 124 is attached to the beverage storage 118 with hinges such that the beverage storage cover 124 can rotate into a vertical configuration during use of the beverage storage 118, then returned to the vertical position during storage or when the beverage storage 118 is not being utilized while filled with chilled beverages or other items needing to be kept cool or cold. The beverage storage 118 is removable from the beverage storage compartment 119. In use, the beverage storage 118 can be filled with ice or any other material capable of maintaining the beverage storage at a desired temperature.

A number of metallic mounting pads 117 are provided to facilitate the attachment of portable, battery powered light sources, such as flexible spotlights, to facilitate the use of the system 100 in environments with limited lighting without affecting the visibility of the viewing screen when in use. These light sources are equipped with a magnetic base which will allow the temporary but solid attachment of the light source to the cabinet. A variety of the metallic mounting pads 117 may be positioned to provide lighting where needed. In a preferred embodiment, the viewing screen cover 106 is metallic, and as such, the magnetic base of the light sources can be selectively and removably attached to the viewing screen cover 106 for convenience lighting when the system is in use.

The viewing screen 110 is secured to the viewing screen mount 122. The viewing screen mount 122 has a pivot plate 123 configured to rotate the viewing screen 110. In some embodiments, the viewing screen 110 can rotate 180 degrees such that the viewing screen 122 is visible from the rear of the cabinet 102, In other embodiments, the viewing screen 110 can rotate a total of 360 degrees to allow the viewing screen 110 to be visible from any angle related to the cabinet 102, The pivot plate 123 is integral to the viewing screen mount 122. The viewing screen 110 is secured to the viewing screen mount 122, The base of the viewing screen mount 122 is secured to the interior of the viewing screen compartment 111. In some embodiments, the viewing screen cover 106 is mounted to the top of the viewing screen mount 122 and rotates with the viewing screen 100 as it rotates.

The viewing screen mount 122 is in the retracted condition during storage such that the viewing screen 110 is completely within the viewing screen compartment 111 and the viewing screen cover 106 sits atop the viewing screen compartment 111. In use, the viewing screen mount 122 extends such that the viewing screen 110 is completely outside the viewing screen compartment 111. The viewing screen 110 can then be rotated using the pivot plate 123 until a desired position is achieved. To store the viewing screen 110, the viewing screen is rotated such that it faces the front of the cabinet 102, and then the viewing screen mount 122 retracts until the viewing screen 110 is fully within the viewing screen compartment 111. When the viewing screen mount 122 is fully retracted, the viewing screen cover 106 comes to rest atop the viewing screen compartment 111 thereby protecting the viewing screen 110, the viewing screen mount 122, the pivot plate 123, and other components located in the interior of the cabinet 102 from any external elements.

In some embodiments, the viewing screen 110 is a television. In other embodiments, the viewing screen 110 is a projection screen for use with a projector. In certain embodiments, the viewing screen comprises multiple sections that unfold to form a viewing screen 110 that is wider than the viewing screen compartment 111. The type of viewing screen 110 can be any type known in the industry. The size of the viewing screen 110 is limited by the space available in the viewing screen compartment 111.

In some embodiments, the portable bar and entertainment system 100 has a sound system. The sound system can be activated with the viewing screen 110 in the fully retracted position, i.e., the storage position, or in the fully extended position. The sound system can play sound associated with images on the viewing screen 110 or it can play other sounds, such as music. In some embodiments, the sound system comprises speakers built into the cabinet 102. In other embodiments, external speakers link to the sound system by way of cables, Bluetooth™, WiFi, or any other connection type known in the industry.

Figure 3:
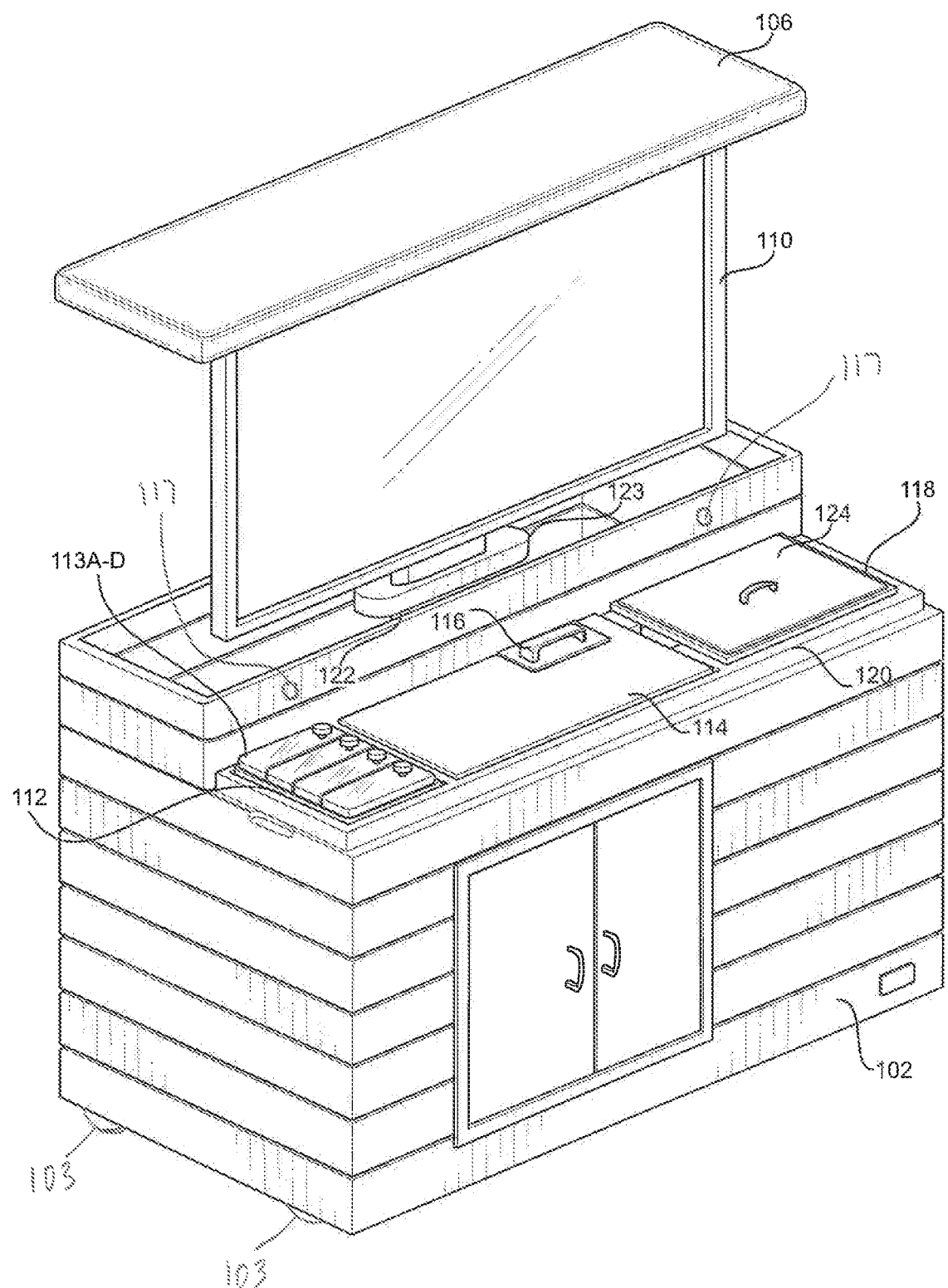
FIG. 3 is a perspective view of the Portable Bar and Entertainment System of FIG. 2.

FIG. 3 is a perspective view of the portable bar and entertainment system 100. As shown in FIG. 3, the viewing screen 110 is in the fully extended position but not rotated. Typical positioning of the condiment holders 113a-d, preparation surface 114, utensil holder 116, and beverage storage 118 with beverage storage cover 124 is shown, however these positions are not to be considered limiting. Also shown is a portion of the viewing screen mount 122 secured to the interior of the viewing screen compartment 111.

Figure 4:
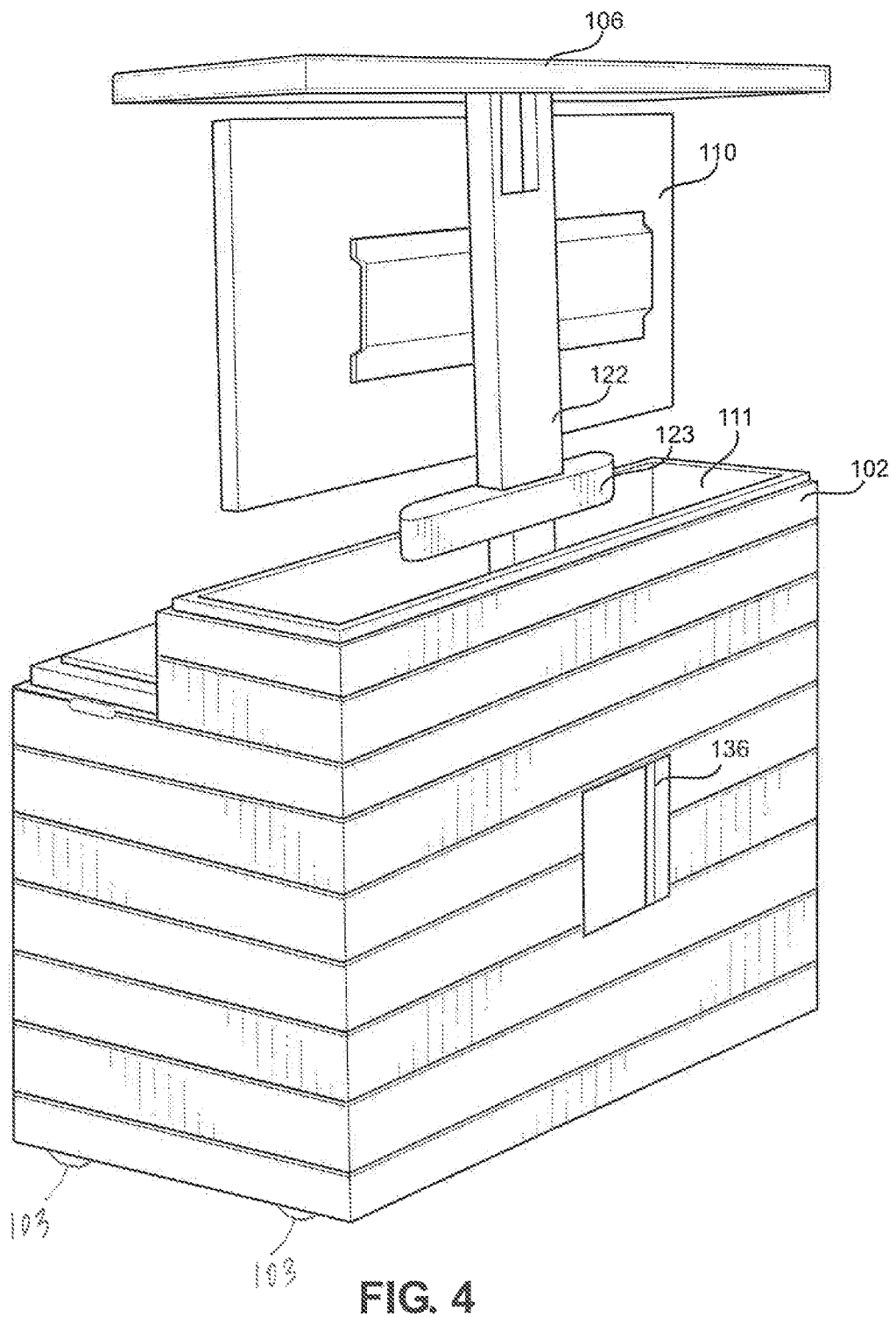
FIG. 4 is a rear perspective view of the Portable Bar and Entertainment System of FIG. 2.

FIG. 4 is a rear perspective view of the portable bar and entertainment system 100. The viewing screen 110 is shown mounted to the viewing screen mount 122, which is in the fully extended position. The viewing screen cover 106 is shown mounted to the viewing screen mount 122. The utility access 136 is shown in the cabinet 102. The utility access 136 allows for access to the components disposed in the interior of the cabinet 102, such as the viewing screen mount 122, sound system components, data connectivity components such as Bluetooth™, WiFi, and local area network connections, and power distribution components such as power strips and circuit protection devices. The components located in the viewing screen compartment 111 can also be accessed through the top of the viewing screen compartment 111 when the viewing screen 110 is in the extended position.

Figure 5:
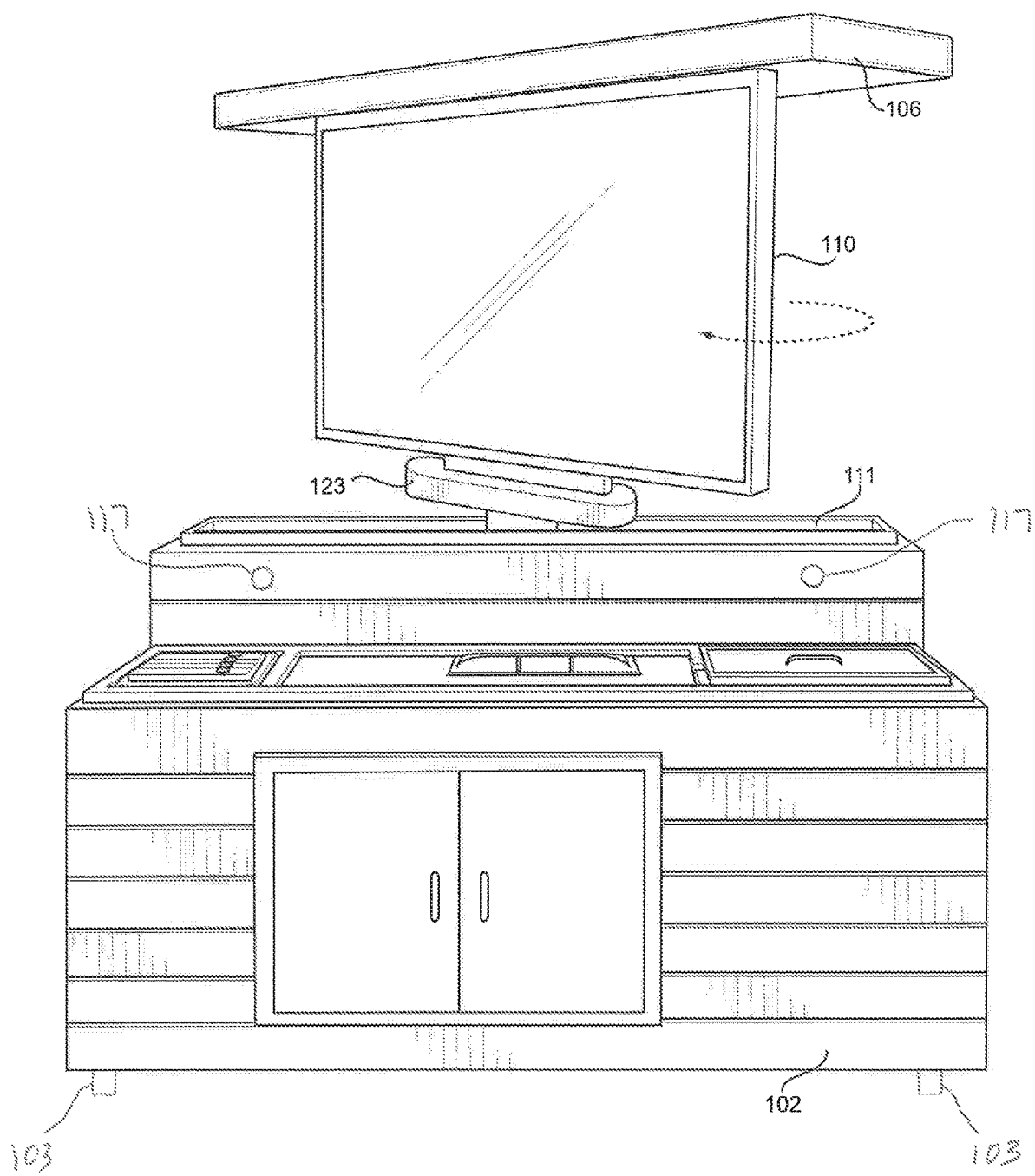
FIG. 5 is a front view of the Portable Bar and Entertainment System with the screen in a partially rotated position.

FIG. 5 is a front view of the portable bar and entertainment system 100 with the viewing screen 110 fully extended from the viewing screen compartment 111 and in a partially rotated position. When the viewing screen 110 is facing forward, it can rotate clockwise or counterclockwise to achieve a desired position using the pivot plate 123 until the viewing screen 110 is facing the rear of the cabinet 102. As shown in FIG. 5, the viewing screen cover 106 rotates with the viewing screen 110 thereby protecting the viewing screen 110 from sun and other weather elements during use.

Figure 6:
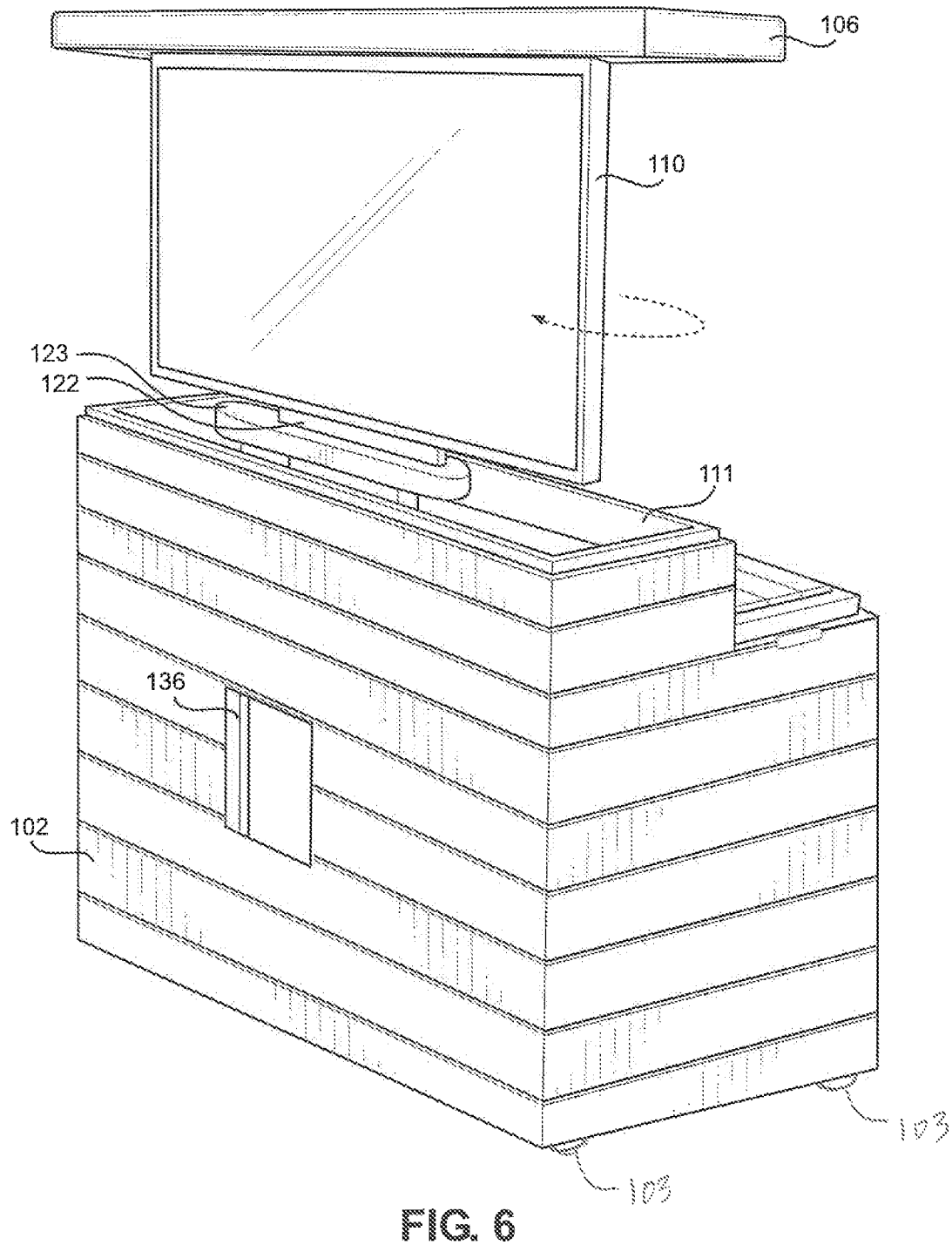
FIG. 6 is a rear perspective view of the Portable Bar and Entertainment System with the screen in a fully rotated position.

FIG. 6 is a rear perspective view of the portable bar and entertainment system 100 with the viewing screen 110 fully rotated such that is faces the rear of the cabinet 102. To return the viewing screen 110 to storage inside the viewing compartment 111, the viewing screen 110 will rotate opposite the direction it rotated to achieve the desired position. For example, if the viewing screen 110 rotated in the clockwise direction to reach the desired position, it will rotate in the counterclockwise direction until it faces forward then retracts into the viewing screen compartment 111.

Figure 7:
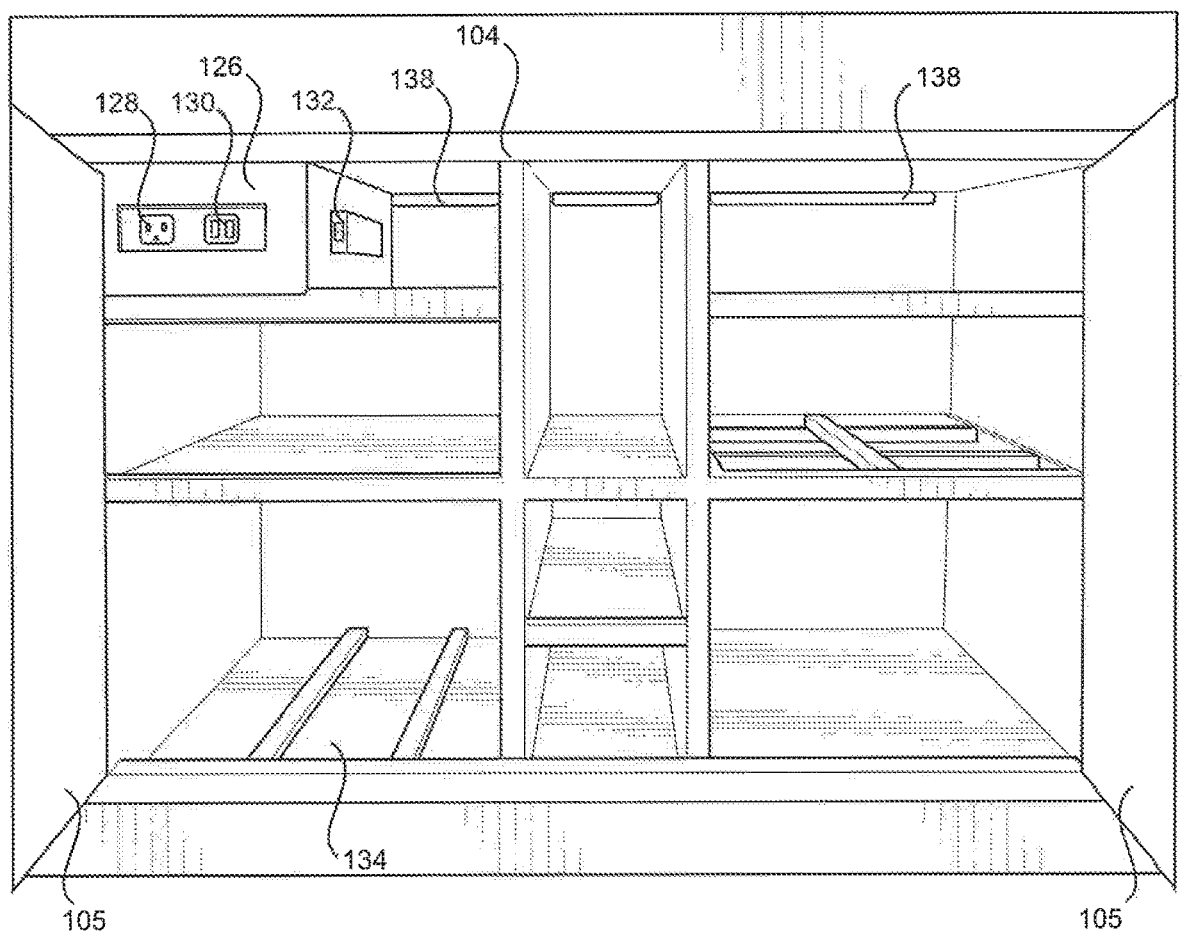
FIG. 7 is an interior view of a storage compartment of the present invention having storage shelves and a utility box.

FIG. 7 is an interior view of the storage compartment 104. The storage compartment 104 can be configured in any manner or layout to achieve the storage needs of the portable bar and entertainment system 100. As an example, as shown in FIG. 7, the storage compartment 104 comprises one large bottle storage shelf 134 and various other shelf sizes for the storage of canned goods and drinks as well as other items used with the portable bar and entertainment system 100. In other embodiments, the storage compartment 104 can comprise multiple large bottle storage shelves 134. In some embodiments, the storage compartment 104 also comprises a utility box 126. The utility box 126 can have a power outlet 128, USB outlets 132, and a dimmer switch 132 for dimming lighting internal to the cabinet 102. In other embodiments, the utility box 126 can have audio/visual input ports that allow for an external device, such as a camcorder, to provide data to the viewing screen 110 and the speaker system, whether internal or external to the cabinet 102 or integral to the viewing screen 110.

Figure 8:
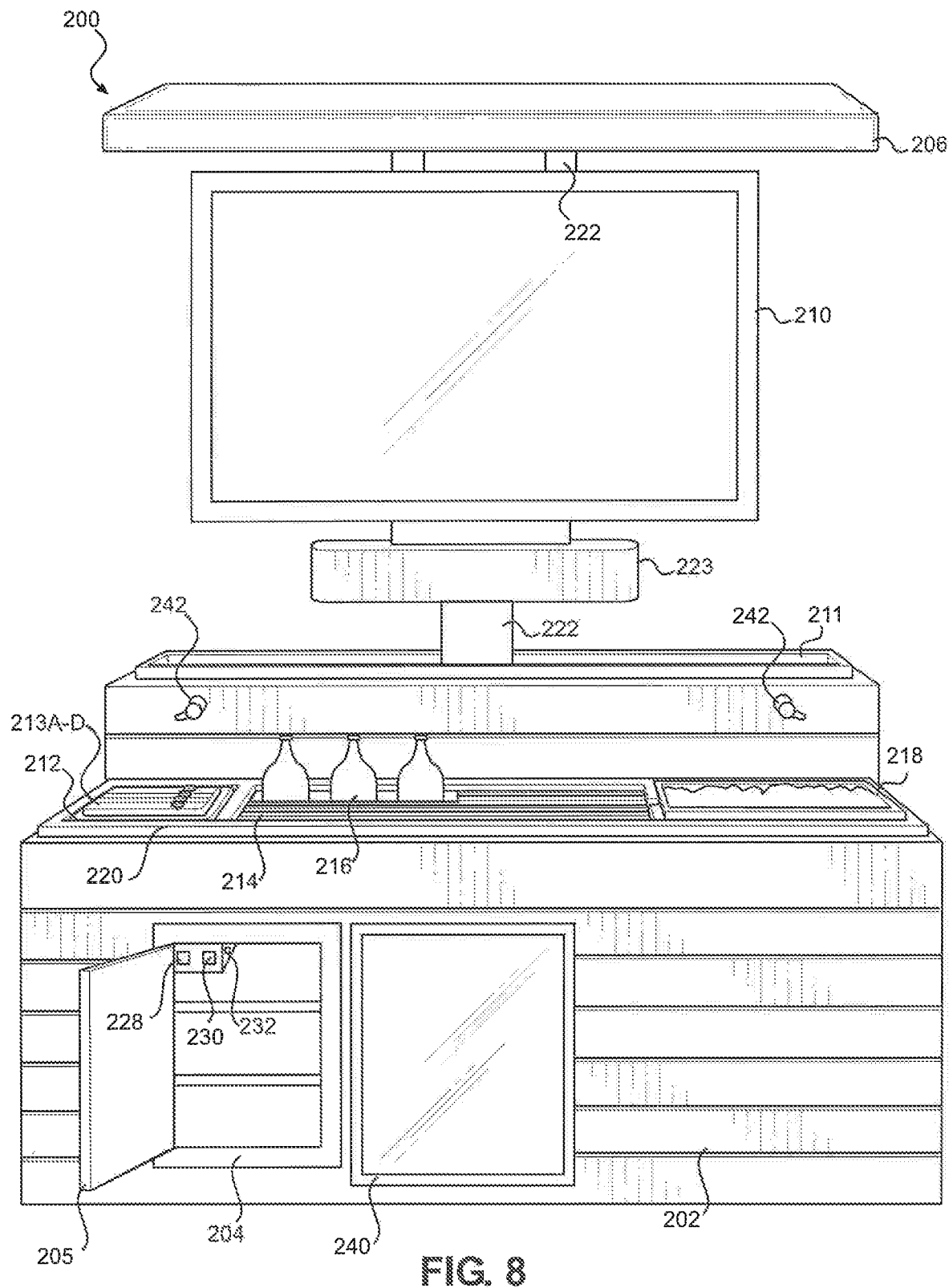
FIG. 8 is a front view of a Portable Refrigerated Bar and Entertainment System of the present invention in the deployed condition.

FIG. 8 is a front view of a portable refrigerated bar and entertainment system and referred to as 200. Similar to the portable bar and entertainment system 100, the portable refrigerated bar and entertainment system 200 comprises a cabinet 202, a storage compartment 204, a storage compartment door 205, a viewing screen cover 206, a viewing screen 210, a viewing screen compartment 211, a service area 220, a condiment holder storage compartment 212, condiment holders 213a-d, a preparation surface 214, utensil storage 216, beverage storage 218, a beverage storage compartment 219, a viewing screen mount 222, a pivot plate 223, a cold storage unit 240, and two convenience lights 242. The portable refrigerated bar and entertainment system 200 also comprises a beverage storage cover 224, a utility box 226 located in the storage compartment 204, and a utility access 236 located on the back of the cabinet 202. The utility box 226 can have a power outlet 228, USB outlets 230, and a dimmer switch 232 that can control some or all lighting associated with the portable refrigerated bar and entertainment system 200.

As shown in FIG. 8, the cold storage unit 240 is a mini-refrigerator; however, the cold storage unit 240 can be any type of unit configured to maintain its contents at a desired temperature. For long-term storage, the portable refrigerated bar and entertainment system 200 can be powered from an external source so that the cold storage unit 240 maintains its contents at a desired temperature for an indefinite period of time.

The convenience lights 242 can be any style or type of light. For example, the convenience lights can be LED, high intensity discharge, compact fluorescent, or any other type of lighting known in the industry that satisfies the lighting needs of the present invention. The convenience lights 242 can be dimmable where the dimmer can be integral to the light fixture or can be controlled by the dimmer switch 232.

In some embodiments, as shown in FIG. 8, one convenience light 242 is located on the front of the viewing screen compartment 211 above the condiment holders 213a-d and another convenience light 242 is located on the front of the viewing screen compartment 211 above the beverage storage 218. In other embodiments, convenience lights 242 can be located at various locations on the cabinet 202.

In some embodiments, a power storage system is used to power the various components of the portable bar and entertainment system 100 or portable refrigerated bar and entertainment system 200. The use of a power storage system allows for placement of the system 100, 200 at any desired location without the need to run power cords to the system 100, 200. Power cords may present a trip hazard or may be unsightly when the system 100, 200 is in use. Any type of power storage system can be used that fulfills the needs of the present invention. For example, the power storage system may be an uninterruptible power supply. As another example, the power storage system can be one or more automotive style batteries. In some embodiments, the power storage system powers an AC inverter, which in turn provides AC power to the internal components. In certain embodiments, a power distribution system controls and distributes power to the internal components. In some embodiments, a charging/maintaining system is used to recharge the power storage system after use and to maintain the power storage system after charging to maximize the life of the power storage system.

Figure 9:
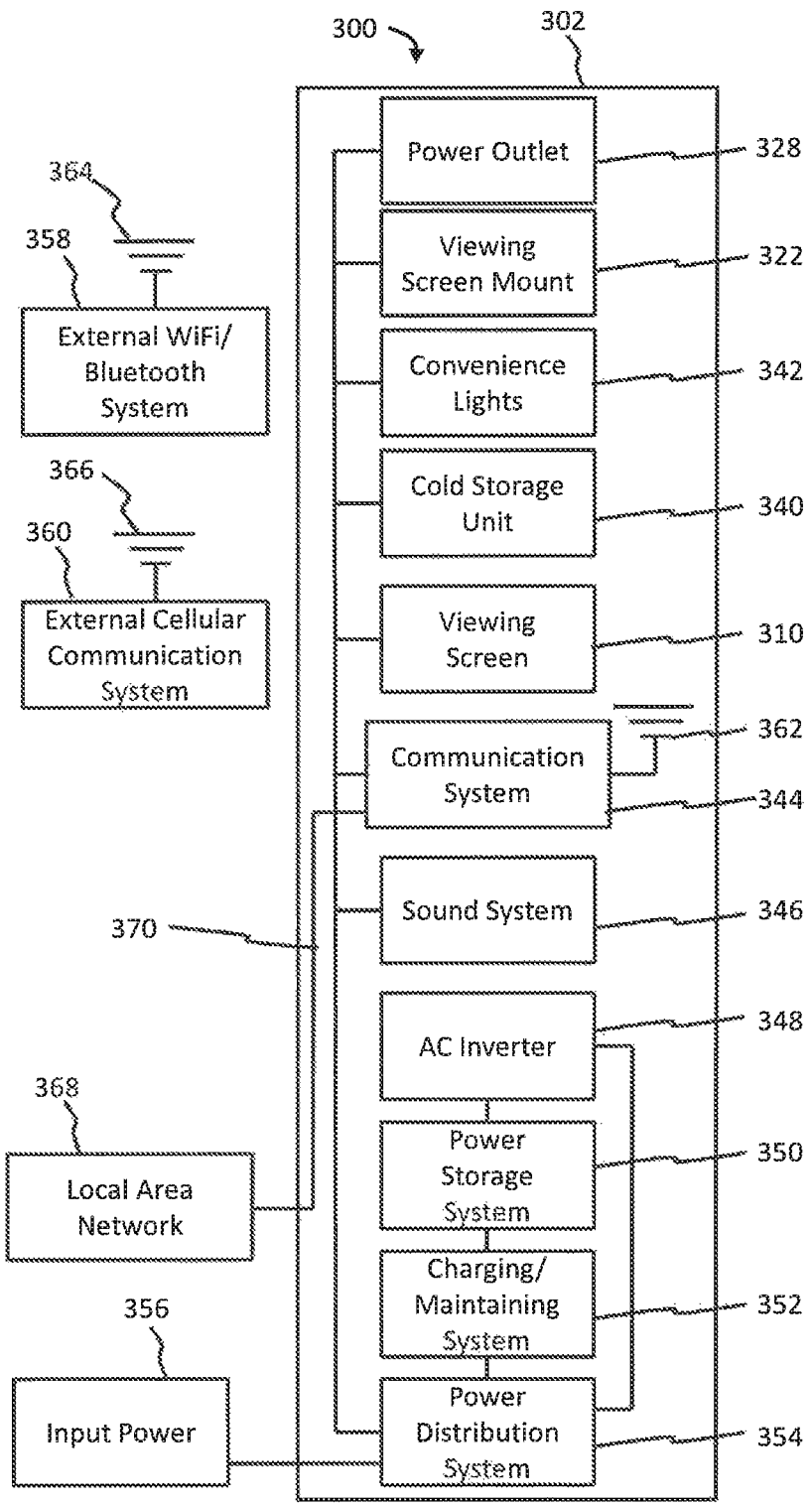
FIG. 9 is a schematic diagram showing communications, power input, and power distribution of the present invention.

Referring now to FIG. 9, a schematic diagram showing communications, power input, and power distribution of a portable refrigerated bar and entertainment system is shown and generally referred to as 300. Cabinet 302 receives power from an input power 356, which feeds a power distribution system 354. The power distribution system 354 can be a dedicated panel containing electrical connection components, such as, for example, terminal blocks and relays. The power distribution system 354 can also be, for example, one or more power strips configured to receive power from the input power 356.

In a typical configuration, the power distribution system 354 receives power from the input power 356 or from an AC inverter 348. Relays or switches can be used to control the source of power to the power distribution system 354, which in turn distributes power to the other components of the portable refrigerated bar and entertainment system 300. The AC inverter 348 receives power from a power storage system 350. The power storage system 350 can be, for example, one or more batteries or any other power storage device known in the industry capable of powering the portable refrigerated bar and entertainment system 300. In some embodiments, the AC inverter 348, the power storage system 350, and the charging/maintaining system 352 are combined into an uninterruptible power supply that receives power from the power distribution system 354 when the power distribution system 354 receives power from the input power 356 and provides power to the power distribution system 354 when the input power 356 is disconnected or otherwise de-energized.

The power storage system 350 receives power from a charging/maintaining system 352, which in turn receives power from the power distribution system 354. When the power distribution system 354 receives power from the input power 356, the charging/maintaining system 352 charges the power storage system 350 until fully charged. When the power storage system 350 is fully charged, the charging/maintaining system 352 will maintain the power storage system 350 to maximize the life of the power storage system 350. For example, the charging/maintaining system 352 will stop charging the power storage system 350 for a variable period of time, depending on the type of power storage system 352 being utilized, then reinitiate charging for a period of time until, for example, the power storage system 350 reaches a peak charged condition, after which, the charging/maintaining system 352 will again cease charging the power storage system 350. When the input power 356 is disconnected or otherwise de-energized, the power distribution system 354 stops supplying power to the charging system 352 and starts receiving power from the AC inverter 348. The AC inverter 348 converts power from the power storage system 350 into power for the components internal to the portable refrigerated bar and entertainment system 300.

In operation, the power distribution system 354 can supply power to components internal to the cabinet 302, for example a power outlet 328, a viewing screen mount 322, one or more convenience lights 342, a cold storage unit 340, a viewing screen 310, a sound system 346, and a communications system 344. It should be appreciated that not all of the components listed that are internal to the cabinet 302 are present in every embodiment. For example, the portable refrigerated bar and entertainment system 300 may not have the cold storage unit 340, the convenience lights 342, or the sound system 346, however this in not to be considered limiting.

The viewing screen mount 322, to which the viewing screen 310 is attached, can raise and lower the viewing screen 310 into and out of the cabinet 302 as well as rotate the viewing screen 310 such that the viewing screen 310 faces the rear of the cabinet 302 while in use.

The communication system 344 is configured to communicate data and control signals with outside sources, such as, for example, an external WiFi/Bluetooth system 358 having an antenna 364, an external cellular communication system 360 having an antenna 366, and a local area network 368 utilizing a communication cable 370. When the communication system 344 communicates wirelessly, such as when the portable refrigerated bar and entertainment system 300 receives a video signal for display in the viewing screen 310, it utilizes an antenna 362 to communicate with the antenna 364 of the external WiFi/Bluetooth system 358 and the antenna 366 of the external cellular communication system 360. The communication system 344 can communicate with a local area network 368 via the communication cable 370. The communication system 344 can receive, for example, video data for display on the viewing screen 301, audio data for broadcast through the sound system 346, and control signals to control the components internal to the cabinet 302. The communication system 344 can receive data for controlling the viewing screen mount 322, for energizing or de-energizing the view screen 310, for controlling the intensity or color of the convenience lights 342, and for controlling the volume of the sound system 346.

Figure 10:
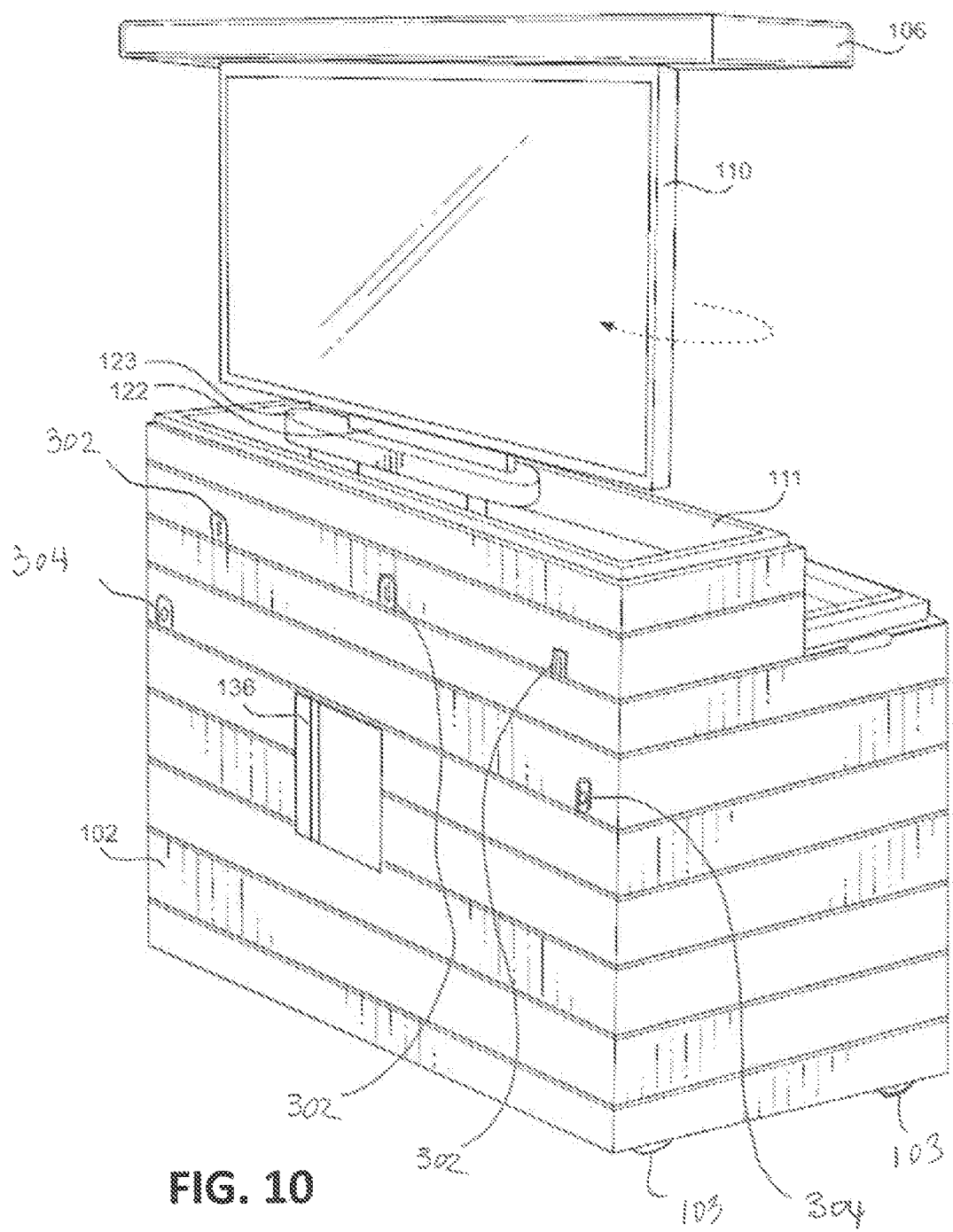
FIG. 10 is a rear perspective view of the Portable Bar and Entertainment System of the present invention equipped with bar counter mounting hardware.
Figure 11:
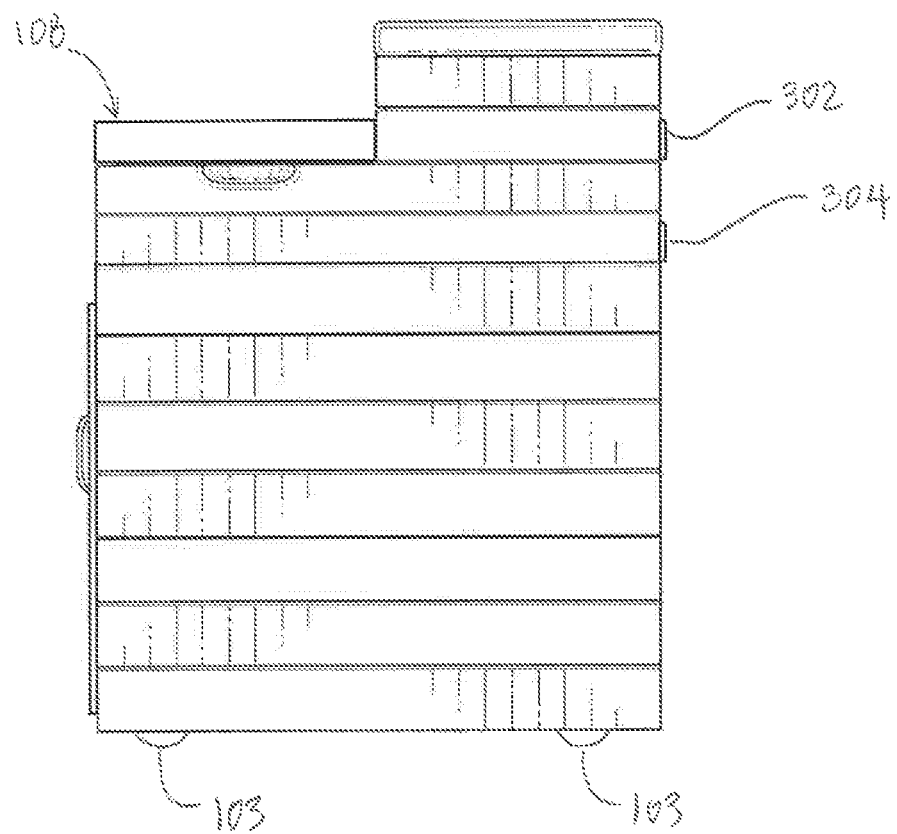
FIG. 11 is a side view of the Portable Bar and Entertainment System of the present invention showing placement of the bar counter mounting hardware on the back side of the system.

Referring now to FIG. 10, the rear panel of cabinet 102 of the Portable Bar and Entertainment System 100 of the present invention is shown and depicts bar counter mounting hardware including a number of cover support hooks 302 in a horizontal line across the back of the cabinet 102, and a number of support arm mounting ports 304 in a horizontal line across the back of the cabinet 102 and below the cover support hooks 302. The purpose of the bar counter mounting hardware is to support the service area cover 108 when the Portable Bar and Entertainment System 100 is in use. As shown in the side view of FIG. 11, the placement of the bar counter mounting hardware 302, 304 on the back side of the system cabinet 102 shows the cover support hooks 302 above the support arm mounting ports 304 spaced apart to provide a cantilevered support when in use as will be described further below.

Figure 12:
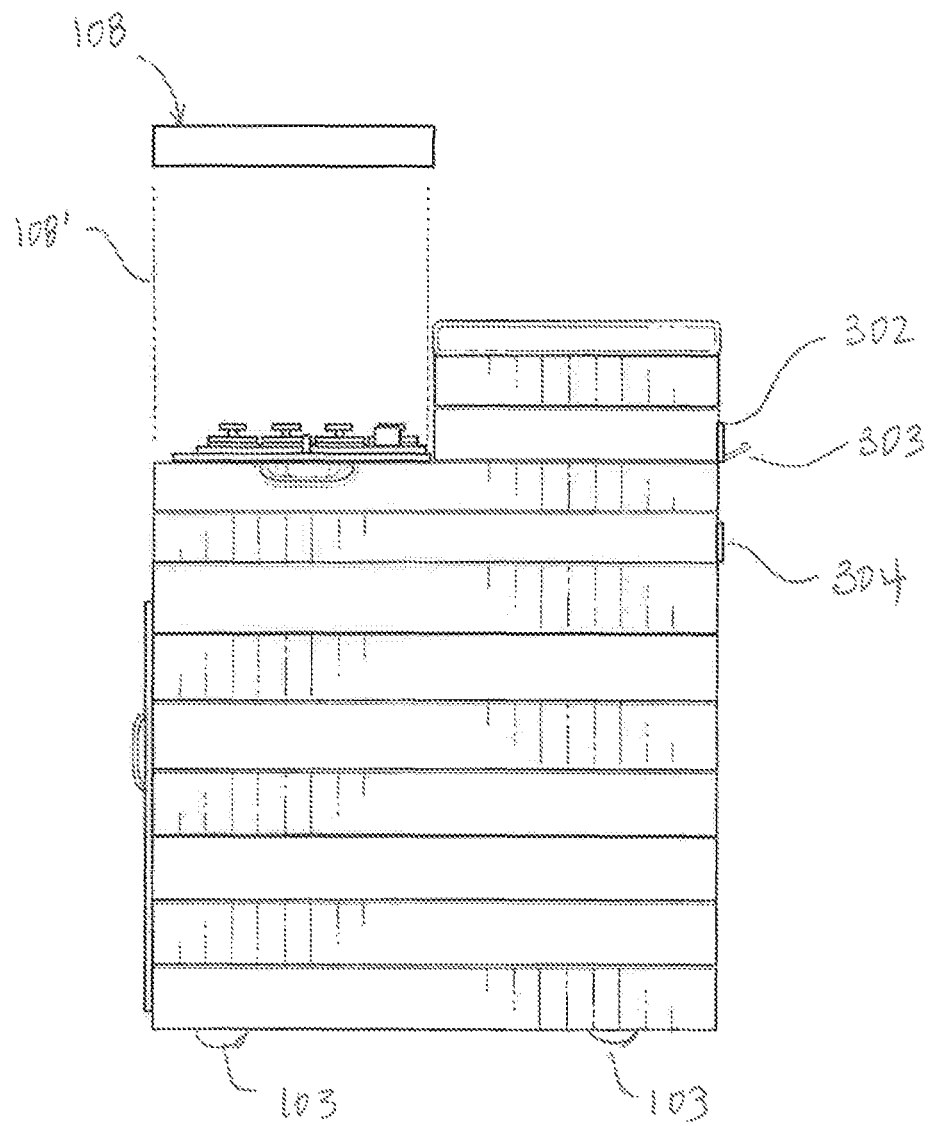
FIG. 12 is a side view of the Portable Bar and Entertainment System of the present invention showing removal of the service area cover and change in the configuration of the bar counter mounting hardware on the back side of the system to accept the edge of the service area cover.
Figure 13:
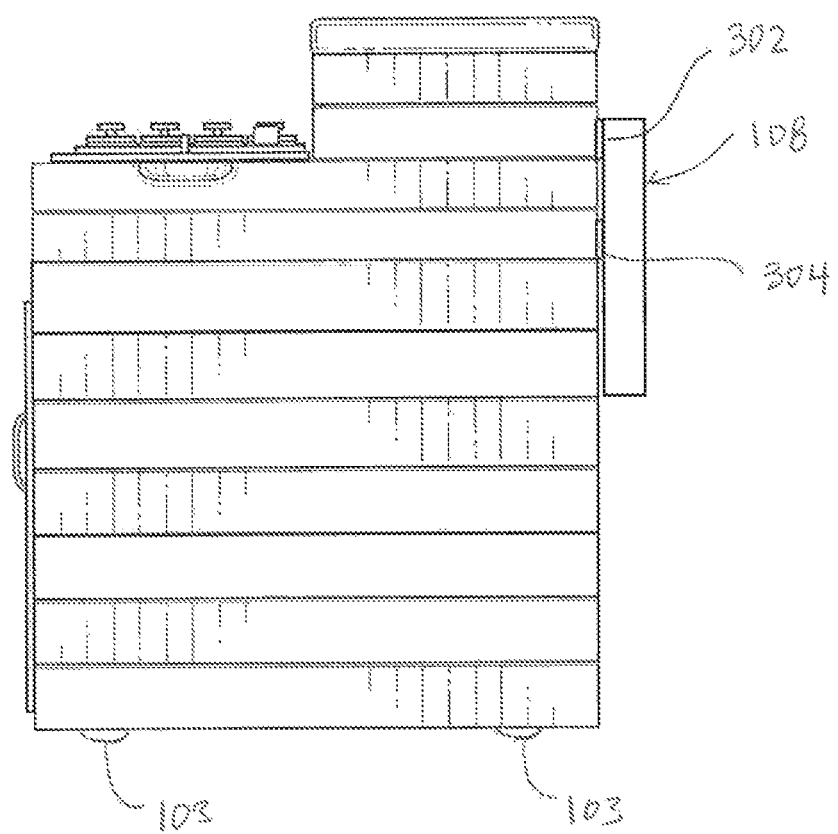
FIG. 13 is a side view of the side view of the Portable Bar and Entertainment System of the present invention showing placement of the service area cover in a storage position hanging on the bar counter mounting hardware.

Referring to FIG. 12, the service area cover 108 is shown removed from the Portable Bar and Entertainment System 100 of the present invention upwards in direction 108', and the reconfiguration of the cover support hooks 302 from a collapsed configuration, to an extended position where the cover hooks 303 protrude from cover support hooks 302 to extend from the back of cabinet 102 to accept the edge of the service area cover 108. As shown in FIG. 13, service area cover 108 is positioned on the cover hooks 303 such that the hooks 303 support the service area cover 108 in a safe, out-of-the-way position where it is easily stored when using the Portable Bar and Entertainment System, and just as easily retrieved when the event is finished and the service area cover is replaced to its original position. When the service area cover 108 is returned to its original placement, cover hooks 303 are returned to their collapsed position within cover support hooks 302 flush against the cabinet 102.

Figure 14:
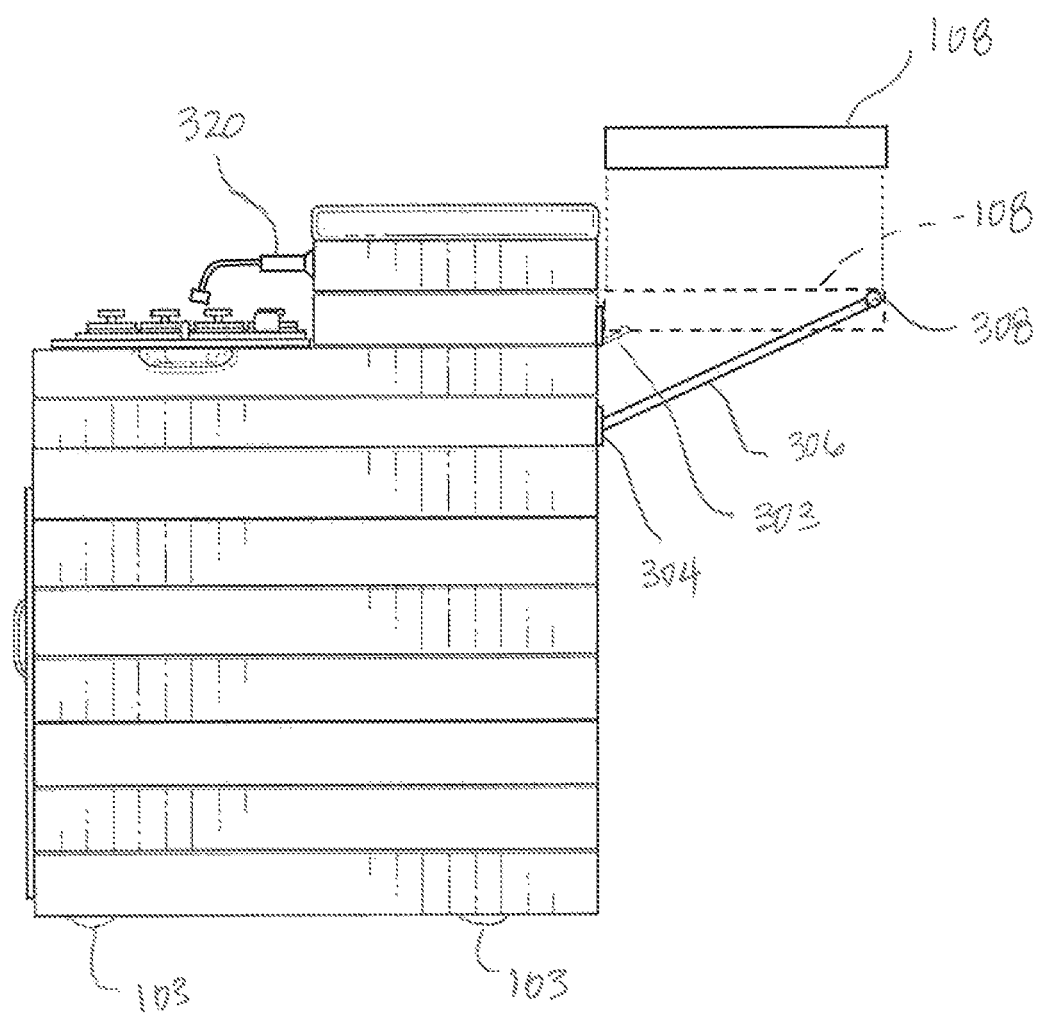
FIG. 14 is a side view of the Portable Bar and Entertainment System of the present invention showing the configuration of the bar counter mounting hardware on the back side of the system to accept the edge of the service area cover, and insertion of a support arm to support the service area cover in a horizontal position extending from the back of the system, with the service area cover positioned above and ready for placement.

FIG. 14 is a side view of the Portable Bar and Entertainment System 100 of the present invention showing the configuration of the bar counter mounting hardware 302, 304 on the back side of the cabinet 102 to accept the edge of the service area cover 108. Also, a support arm 306 having a rounded shock-absorbing tip 308 is inserted into support arm mounting ports 304 and extending upwards at an angle. Service area cover 108 is shown positioned above the cover support hooks 302 with extended cover hooks 303 and support arms 306, and then lowered into position in which the cover support hooks engage the edge of the service area cover 108 adjacent the cabinet, and the shock-absorbing tip 308 of the support arm 306 support the underside of the service area cover 108. A magnetically attachable light source 320 is shown as attached to metallic mounting pads 117 for convenient lighting.

Figure 15:
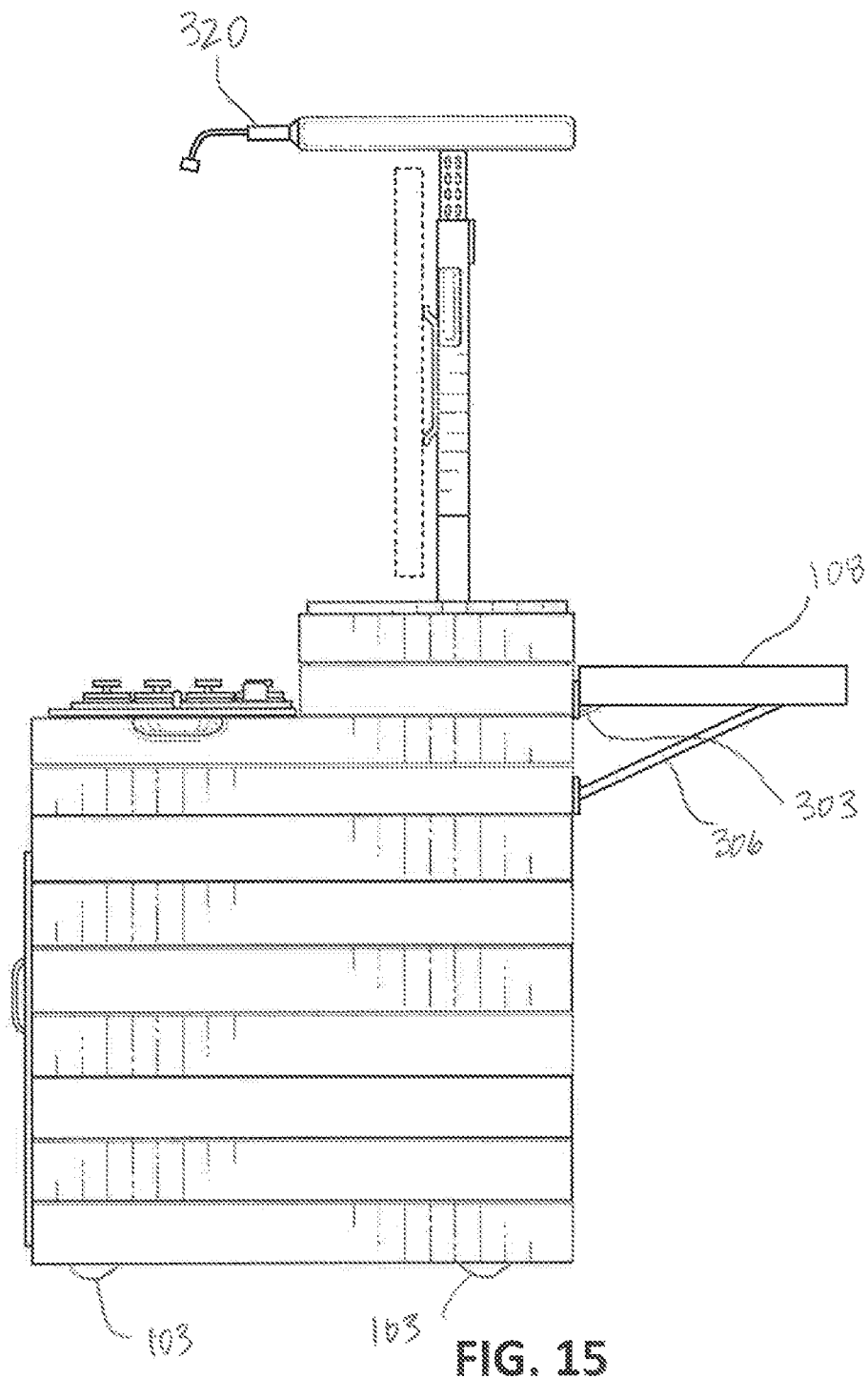
FIG. 15 is a side view of the of the Portable Bar and Entertainment System of the present invention showing the configuration of the bar counter mounting hardware on the back side of the system to accept the edge of the service area cover, placement of the support arm to support the service area cover in a horizontal position extending from the back of the system, and the service area cover positioned upon the bar counter mounting hardware, and with the screen cover in the raised position and equipped with a magnetically attachable spotlight.

In the configuration as shown in FIG. 15, the bar counter mounting hardware 302, 304 on the back side of the cabinet 102 supports the service area cover 108 in a horizontal position extending from the back of the cabinet 102. The vertical separation of the cover support hooks 302 and the support arm mounting ports 304, when combined with the service area cover 108, create a triangular support structure. This enables the service area cover 108 to serve as a bar counter capable of supporting significant weight that is securely attached to the cabinet 102 for use. Also shown in FIG. 15 is a magnetically attached light source 320 which, in this configuration, is magnetically attached to the metallic screen cover.

Figure 16:
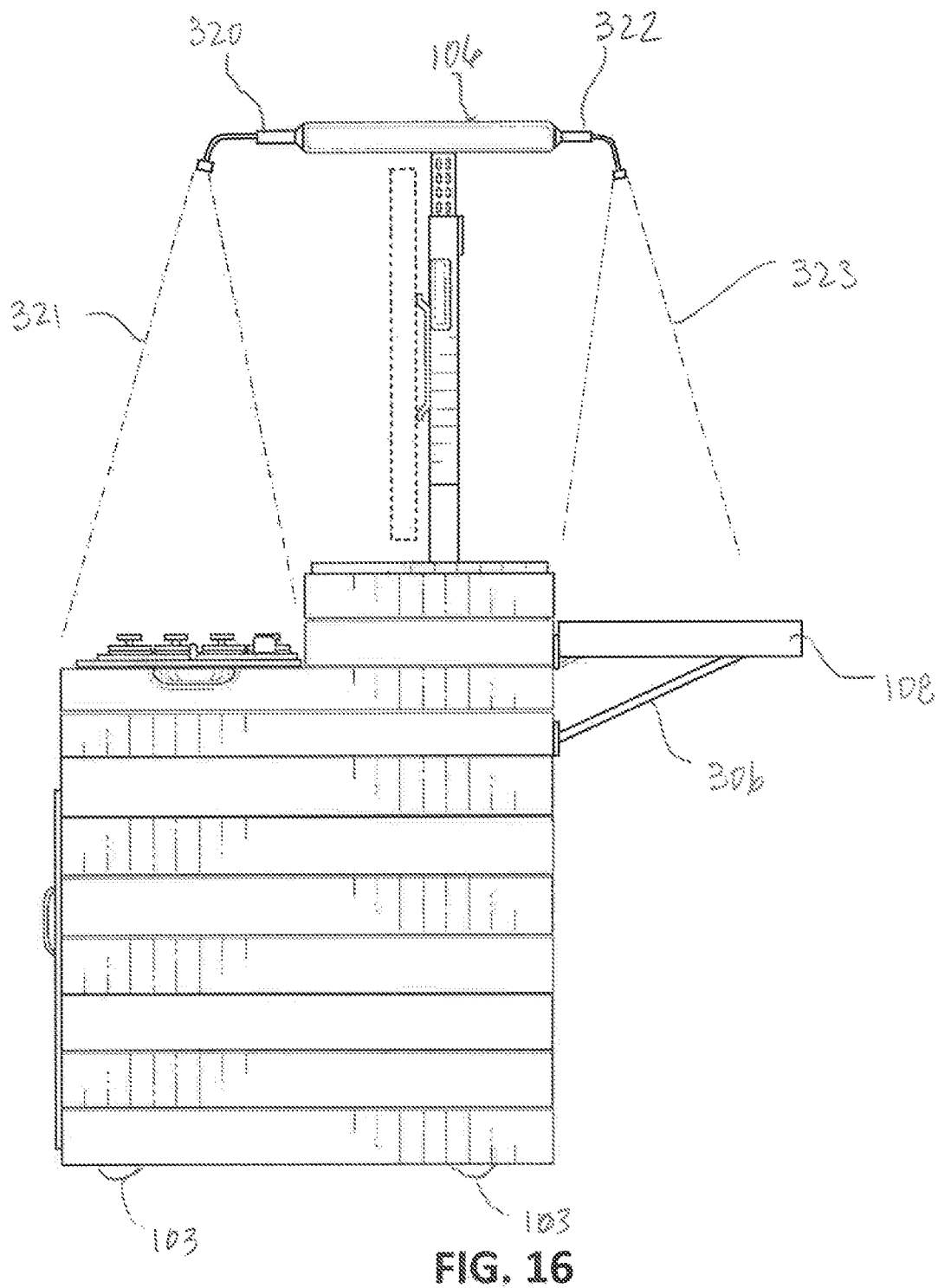
FIG. 16 is a side view of the of the Portable Bar and Entertainment System of the present invention showing the configuration of the bar counter mounting hardware on the back side of the system to accept the edge of the service area cover, configuration of the service area cover as a bar counter, and with the screen cover in the raised position and equipped with a magnetically attachable spotlights on both the bar counter side and bar server side with each having its own lighted area so as to customize the lighting for use.

FIG. 16 is a side view of the of the Portable Bar and Entertainment System 100 of the present invention showing the configuration of the bar counter mounting hardware 302, 303, 304 on the back side of the cabinet 102 system to accept the edge of the service area cover 108. In this configuration of the service area cover 108 as a bar counter, bar stools may be used (not shown), and can provide a counter for use when the screen panel is in the lower position as a typical bar counter, as well as when it is in the raised position. With the screen cover 106 in the raised position, it is shown equipped with magnetically attachable spotlights 320 on the bar server side, and spotlights 322 on the bar counter side with each having its own lighted area 321 and 323 respectively so as to customize the lighting for use. It is to be appreciated that these magnetically attachable lights may be mounted to any ferrous component in the Portable Bar and Entertainment System 100 of the present invention.

Figure 17:
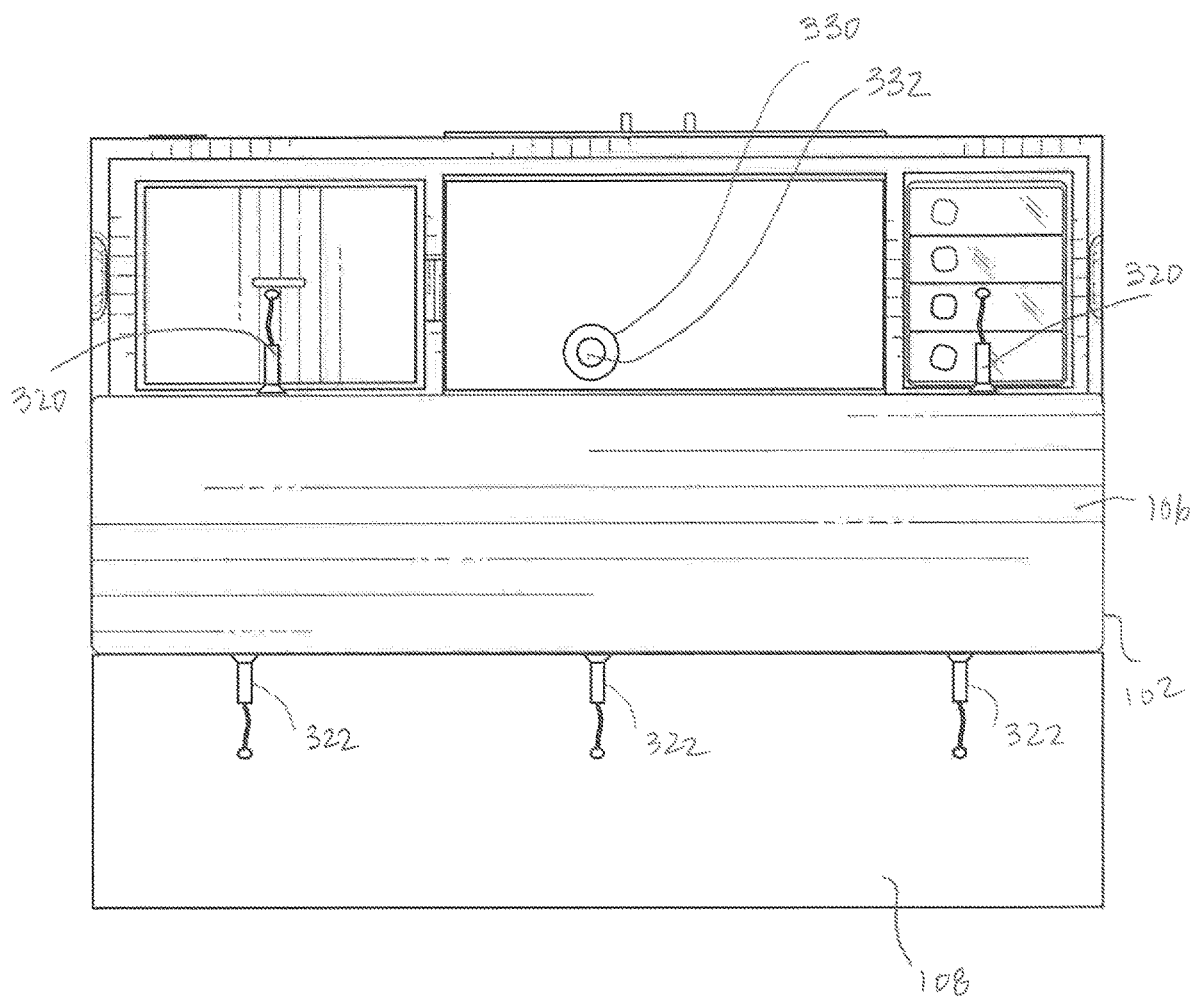
FIG. 17 is a top view of the of the Portable Bar and Entertainment System of the present invention showing the service area cover n a horizontal position extending from the back of the system, the screen cover in the raised position and equipped with a magnetically attachable spotlights, and an umbrella mounting port on the surface of the system.

Referring now to FIG. 17, a top view of the of the Portable Bar and Entertainment System 100 of the present invention is shown with the service area cover 108 in the bar counter configuration. The service area cover 108 is extending in a horizontal position back of the cabinet 102, and the screen cover 106 is in the raised position and equipped with a number of magnetically attachable spotlights 320 and 322.

Figure 18:
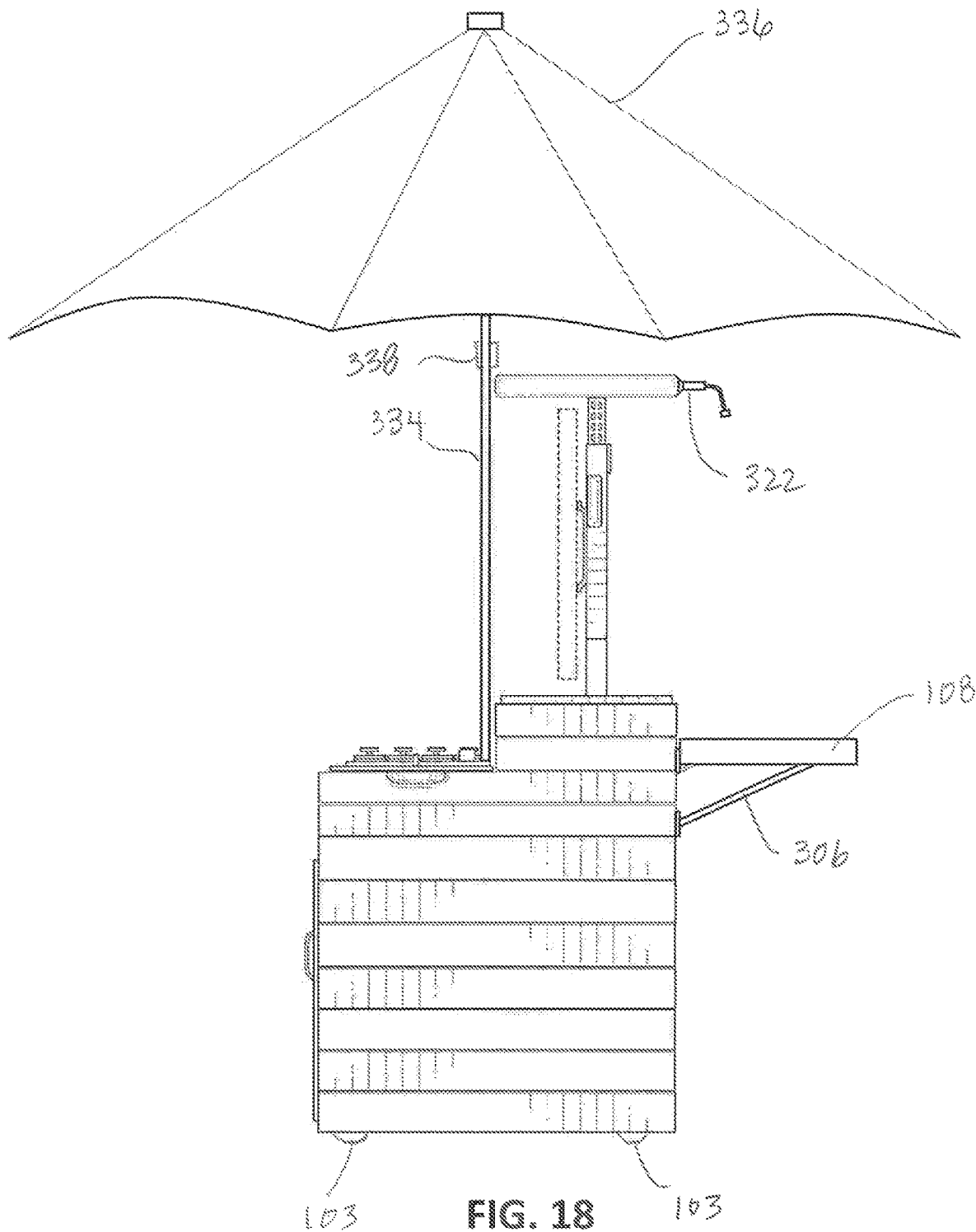
FIG. 18 is a side view of the of the Portable Bar and Entertainment System of the present invention showing the configuration of the service area cover in the bar counter position, and showing the placement of an umbrella extending from the umbrella mounting port to provide shade to the system.

In this embodiment, cabinet 102 is equipped with an umbrella mounting flange 330 having an umbrella mounting port 332 sized to receive an umbrella post 334 (shown in FIG. 18). The umbrella mounting flange 330 is positioned to allow the screen cover to be substantially unaffected by the insertion of an umbrella post 334 into cabinet 102 and the positioning of an umbrella, and can accommodate slight rotation of the screen cover 106 when an umbrella post is present, yet remains sufficiently central to the cabinet so that the cabinet will provide substantial ballast for unexpected wind gusts.

FIG. 18 is a side view of the of the Portable Bar and Entertainment System 100 of the present invention showing the configuration of the service area cover 108 in the bar counter position on cabinet 102, and showing the placement of an umbrella post 334 extending from the umbrella mounting port 332 to provide shade to the system. Umbrella 336 is sized to provide ample shade to the Portable Bar and Entertainment System 100, as well as the people behind the bar as well as at the service area cover 108 bar.

This configuration of the Portable Bar and Entertainment System of the present invention depicts the viewing screen 110 facing towards the front of cabinet 102. If it is desired to rotate the viewing screen 110 to face the service area cover 108 bar counter, the complete 180 degree rotation must be made before the umbrella post is inserted into the umbrella mounting port 332. Smaller rotations, however, can be made with the umbrella fully installed.

Figure 19:
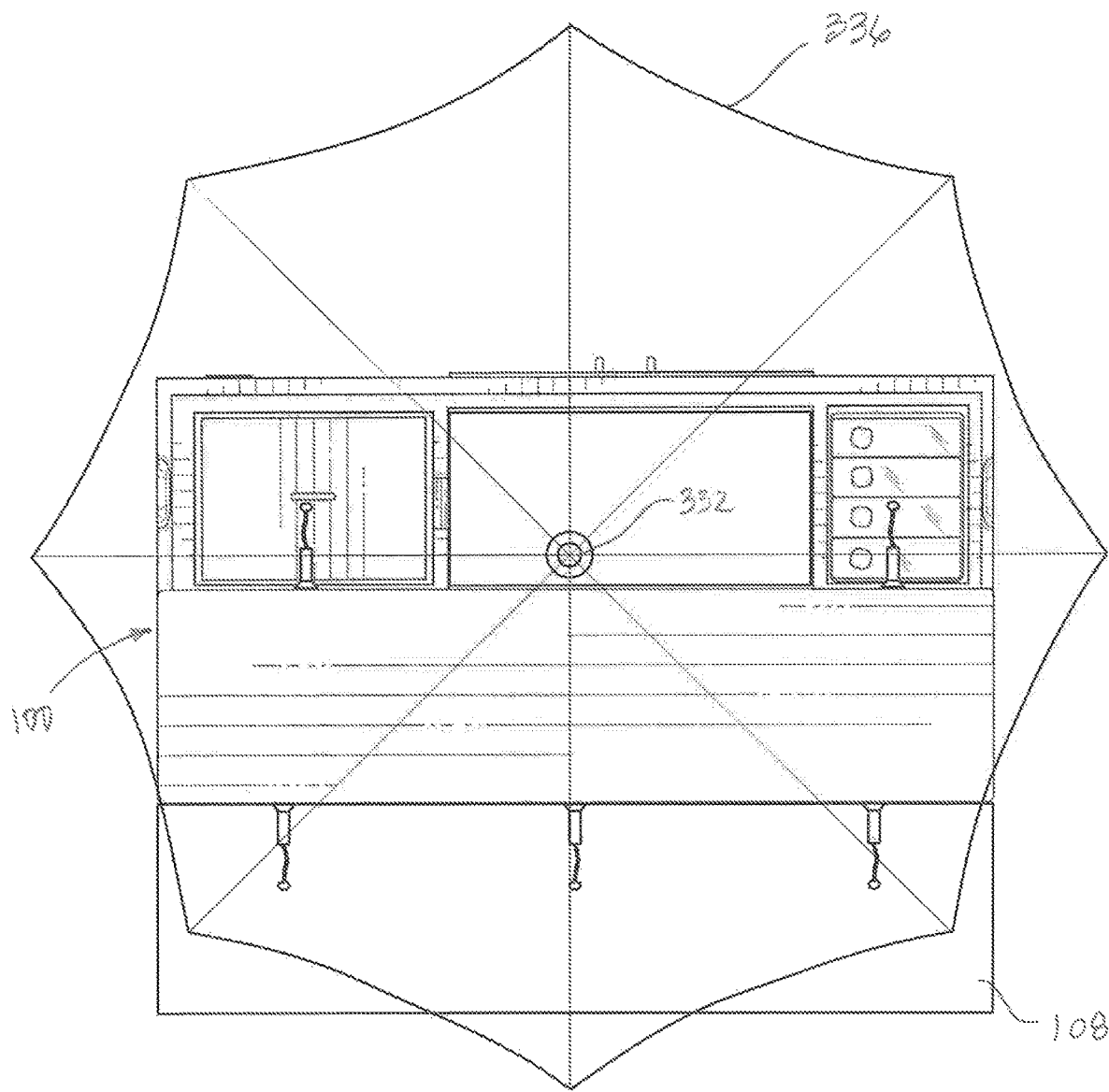
FIG. 19 is a top view of the of the Portable Bar and Entertainment System of the present invention showing the configuration of the service area cover in the bar counter position, and showing the placement of an umbrella extending from the umbrella mounting port to provide shade to the system.

As shown in FIG. 19, the top view of the of the Portable Bar and Entertainment System 100 of the present invention shows the placement of umbrella 336 extending from the umbrella mounting port 332 to provide shade to the entire system 100. It is to be appreciated that umbrella 336 is of the type known in the industry, and may have a swivel 338 that allows the tilting of the upper portion of the umbrella post 334 to accommodate the movement of the sun throughout the day.

The embodiments described herein are not intended to be exhaustive or to limit the invention to the precise forms disclosed in the detailed description above. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

It is understood that although a number of different embodiments of the present invention have been illustrated and described herein, one or more features of any one embodiment can be combined with one or more features of one or more of the other embodiments, provided that such combination satisfies the intent of the present invention.

While a number of exemplary aspects and embodiments of the present invention have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope,

What is claimed is:

1. A portable bar and entertainment system, comprising:
a cabinet, having a storage compartment, a screen compartment, and a service area;
a removable service area cover;
bar counter mounting hardware
a screen cover; and
a viewing screen,
wherein the cabinet has a front side and a rear side, the service area located at the front side and the screen compartment located behind the service area and extending to the rear side, and wherein the screen compartment extends to a height greater than the service area thereby defining a vertical surface at a rear end of the service area,
wherein the screen cover and viewing screen have a storage configuration in which the viewing screen is located inside the screen compartment and the screen cover seals the screen compartment, and an extended configuration, in which the screen cover and viewing screen are raised above the screen compartment such that the screen is visible to users,
wherein the bar counter mounting hardware is located on the backside of the cabinet and comprises cover support hooks and mounting ports located some distance below the cover support hooks,
wherein the cover support hooks are extendable from a collapsed configuration against the backside of the cabinet to an extended configuration for receiving the removable service area cover, and the mounting ports have support arms are insertable into the mounting port that extend upwards at an angle away from the mounting port, and
wherein the removable service area cover is configured to be removable from the service area and placed atop the support arms and the cover support hooks such that the removable service area cover forms a workable surface that extends from the backside of the cabinet when the cabinet is in use.

2. The portable bar and entertainment system of claim 1, further comprising magnetically attachable spotlights,
wherein the service area comprises a condiment holder storage compartment, a preparation surface, a utensil storage, and a beverage storage, and
wherein the vertical surface at the rear end of the service area comprises a set of metallic mounting pads configured to receive the magnetically attachable spotlights.

3. The portable bar and entertainment system of claim 1, further comprising a viewing screen mount to which the viewing screen is attached, the viewing screen mount configured to rotate the screen for viewing at any angle along an axis extending upward from the cabinet when the viewing screen is in the extended configuration.

4. The portable bar and entertainment system of claim 1, further comprising a sound system comprising speakers built into the cabinet.

5. The portable bar and entertainment system of claim 1, further comprising a cold storage unit integrated into the cabinet.

6. The portable bar and entertainment system of claim 1, further comprising a power storage system configured to provide power to the internal components.

7. The portable bar and entertainment system of claim 6, wherein the power storage system comprises one or more automotive style batteries.

8. The portable bar and entertainment system of claim 7, further comprising an inverter configured to receive power from the power storage system and provide alternating current.

9. A portable bar and entertainment system, comprising:
a cabinet, having:
    a storage compartment,
    a cold storage unit,
    a screen compartment, and
    a service area;
a rotatable viewing screen located above the cabinet and retractable into the screen compartment;
a power distribution system configured to provide power to the cold storage unit and the viewing screen, and
wherein the screen compartment is located behind the service area and extends to a height above a height of the service area,
wherein a front of the screen compartment comprises a set of metallic mounting pads and removable spotlights magnetically attached to the set of metallic mounting pads, the removable spotlights configured to illuminate the service area,
wherein the backside of the cabinet has cover support hooks and mounting ports located some distance below the cover support hooks,
wherein the cover support hooks are extendable from a collapsed configuration against the backside of the cabinet to an extended configuration to accept an edge of the service cover,
wherein the mounting ports have support arms inserted into the mounting port that extend upwards at an angle away from the mounting port, and
wherein the removable service area cover is configured to be removable from the service area and placed atop the support arms and the cover support hooks such that the removable service area cover forms a workable surface that extends from the backside of the cabinet when the cabinet is in use.

10. The portable bar and entertainment system of claim 9, further comprising a power storage system and a charging system.

11. The portable bar and entertainment system of claim 10, wherein the power storage system comprises one or more automotive batteries.

12. The portable bar and entertainment system of claim 11, further comprising an AC inverter configured to convert DC power from the one or more automotive batteries into AC power for the cold storage unit and the viewing screen.

13. The portable bar and entertainment system of claim 9, further comprising a viewing screen cover configured to seal the viewing screen compartment when the viewing screen is retracted, and a service area cover.

14. The portable bar and entertainment system of claim 13, wherein the viewing screen cover comprises a gasket configured to prevent external elements from entering into the viewing screen compartment, and wherein the service area cover comprises a gasket configured to prevent external elements from entering into the service area.

15. The portable bar and entertainment system of claim 9, wherein the service area comprises a condiment holder storage compartment, a preparation surface, a utensil storage, and a beverage storage.

16. The portable bar and entertainment system of claim 15, wherein the condiment holder storage compartment comprises a plurality of condiment holders.

17. A portable bar and entertainment system, comprising:
a cabinet, having a storage compartment, a screen compartment, and a service area;
a set of metallic mounting pads on a front side of the screen compartment and configured to mount lights;
a removable service area cover;
a screen cover;
a viewing screen;
a viewing screen mount;
convenience lights;
a cold storage unit;
a communications system;
a sound system;
a power storage system with an AC inverter;
a charging system;
a power distribution system; and
an umbrella mounting port,
wherein the screen cover and viewing screen have a storage configuration in which the viewing screen is located inside the screen compartment and the screen cover seals the screen compartment, and an extended configuration, in which the screen cover and viewing screen are raised above the screen compartment such that the screen is visible to users,
wherein the backside of the cabinet has cover support hooks and mounting posts located some distance below the cover support hooks,
wherein the cover support hooks are extendable from a collapsed configuration against the backside of the cabinet to an extended configuration to accept an edge of the service cover,
wherein the mounting ports have support arms with shock absorbing tips inserted into the mounting port that extend upwards at an angle away from the mounting port, and
wherein the removable service area cover is configured to be removable from the service area and placed atop the shock absorbing tips of the support arms and the cover support hooks such that the removable service area cover forms a workable surface that extends from the backside of the cabinet when the cabinet is in use.

18. The portable bar and entertainment system of claim 17, wherein the cold storage unit comprises a mini refrigerator.

19. The portable bar and entertainment system of claim 17, wherein the communications system comprises a WiFi and Bluetooth system.

20. The portable bar and entertainment system of claim 19, wherein the communications system is configured to receive video data for display on the viewing screen and audio data for broadcast through the sound system.

\* \* \* \* \*